US007146837B2

(12) United States Patent
Schmidt

(10) Patent No.: US 7,146,837 B2
(45) Date of Patent: Dec. 12, 2006

(54) POWER CRIMPING TOOL

(76) Inventor: Christopher J. Schmidt, 244 N. Oxford Valley Rd., Fairless Hills, PA (US) 19030

( * ) Notice: Subject to any disclaimer, the term of this patent is extended or adjusted under 35 U.S.C. 154(b) by 110 days.

(21) Appl. No.: 10/941,378

(22) Filed: Sep. 15, 2004

(65) Prior Publication Data

US 2005/0056072 A1 Mar. 17, 2005

Related U.S. Application Data

(60) Provisional application No. 60/503,669, filed on Sep. 16, 2003.

(51) Int. Cl.
*B23P 11/00* (2006.01)
*B21D 39/00* (2006.01)

(52) U.S. Cl. .................... 72/325; 72/453.16; 29/243.5

(58) Field of Classification Search ................. 72/325, 72/453.16, 416, 407; 29/243.58, 243.57, 29/243.5

See application file for complete search history.

(56) References Cited

U.S. PATENT DOCUMENTS

| | | | | |
|---|---|---|---|---|
| 2,944,262 | A * | 7/1960 | Richman et al. | 72/325 |
| 3,188,729 | A * | 6/1965 | Pogue, Jr. et al. | 29/243.58 |
| 4,403,722 | A | 9/1983 | Nikolich | 227/8 |
| 4,483,473 | A | 11/1984 | Wagdy | 227/8 |
| 4,483,474 | A | 11/1984 | Nikolich | 227/8 |
| 4,522,162 | A | 6/1985 | Nikolich | 123/46.5 C |
| RE32,452 | E | 7/1987 | Nikolich | 123/46 SC |
| 4,893,493 | A * | 1/1990 | Jacques et al. | 72/325 |
| 4,989,438 | A * | 2/1991 | Simon | 72/325 |
| 5,040,400 | A * | 8/1991 | Nastasi | 72/325 |
| 5,765,428 | A * | 6/1998 | Lallier | 72/325 |
| 2002/0062551 | A1* | 5/2002 | Jacoby | 29/798 |

OTHER PUBLICATIONS

ITW Ramset/Red Head TRAKFAST™ Operating Manual, Model TF1100, 16 pages (printed Nov. 1998).

* cited by examiner

*Primary Examiner*—Daniel C. Crane
(74) *Attorney, Agent, or Firm*—Synnestvedt & Lechner LLP

(57) ABSTRACT

A tool for crimping work pieces to one another is disclosed. The tool is mounted on a power actuator having a reciprocating ram for effecting crimping. The tool includes a body engageable with the workpiece. A movable head is mounted on the body and receives the ram. A jaw is pivotably mounted on the body. A link connects the head to the jaw, which pivots in response to the ram engaging and moving the head. The jaw has a tooth that penetrates the work pieces upon pivoting of the jaw. Penetration of the work pieces by the tooth crimps the pieces to one another. A receiver is mounted on the body to permit its engagement with the actuator by means of an attachment device adapted to a particular actuator. The tool may be removably attachable to the actuator or permanently attached thereto.

12 Claims, 8 Drawing Sheets

POWER CRIMPING TOOL

FIELD OF THE INVENTION

This invention concerns a power tool for crimping two workpieces together.

BACKGROUND OF THE INVENTION

During the installation of drywall, it is the practice to finish outside corners by affixing a metal angle piece along the corner from ceiling to floor. The angle piece covers and protects the edges of the drywall panels which are relatively brittle and subject to wear and damage by impact. The angle piece has a pair of elongate, thin gauge flanges which are joined lengthwise to form a bead at the vertex of the angle piece to provide increased stiffness.

Once affixed in place, drywall compound is applied to feather the surface of the drywall panels at the corner, thereby presenting a neat appearance. It is preferred to affix the angle piece to the drywall by crimping the flanges into the drywall at a number of points along the length of the corner. Crimping is efficient as it avoids the need for fasteners. However, it is generally performed manually using a crimping tool and a hammer. In attaching the angle piece to the drywall, the crimping tool is held in contact with the angle piece which is positioned against the drywall with the flanges engaging the panels at the outside corner. The crimping tool has a pair of jaws which are arranged so that each one faces one of the flanges of the angle piece. Each jaw is pivotally mounted on the tool and has a tooth which will move into the flange and crimp it to the drywall when the jaw is pivoted. An impact head is mounted on the tool between the jaws. The impact head moves relatively to the tool when struck with the hammer. The jaws are mechanically linked to the head and will pivot in response to the head motion. Crimping of the angle to the drywall is effected when the hammer strikes the impact head, causing the jaws to pivot and forcing the teeth into the flanges and the drywall.

Both the crimping tool and the hammer are heavy, and as multiple crimps must be made for each corner angle, it is apparent that such work will be fatiguing and may also result in repetitive motion injury. It is clear that efficiency and productivity would be improved and repetitive motion injury could be avoided by providing a power tool for crimping angle pieces to outside corners formed by drywall panels.

SUMMARY OF THE INVENTION

The invention concerns a tool for crimping a first workpiece to a second workpiece positioned beneath the first workpiece. Specifically, the first workpiece may be a metal angle piece for drywall finishing and the second workpiece may be a pair of drywall panels forming an outside corner. The tool comprises a body having first and second contact surfaces engageable with the first workpiece. The contact surfaces are oriented at a right angle to one another to receive the outside corner formed by the drywall. A first jaw is pivotally mounted on the body adjacent to the first contact surface and a first tooth is mounted on the first jaw. The first tooth is movable in a direction facing outwardly from the first contact surface upon pivoting of the first jaw. A second jaw is pivotally mounted on the body adjacent to the second contact surface and a second tooth is mounted on the second jaw. The second tooth is movable in a direction facing outwardly from the second contact surface upon pivoting of the second jaw. An actuator having a movable ram is positioned proximate to the body. A head is movably mounted on the body. The head is engaged with the ram, and the ram effects motion of the head. A pair of links connect the jaws to the head. Each link has a first end pivotally attached to the head and a second end pivotally attached to a respective jaw. Crimping of the angle piece to the drywall is effected by the actuator powered ram moving the head, the links causing pivoting of the jaws in response to the head motion, the teeth being thereby forced into the flanges and the drywall. The actuator may be powered by any practical means, such as electrically or pneumatically.

DETAILED DESCRIPTION OF THE EMBODIMENTS

Figure 1:
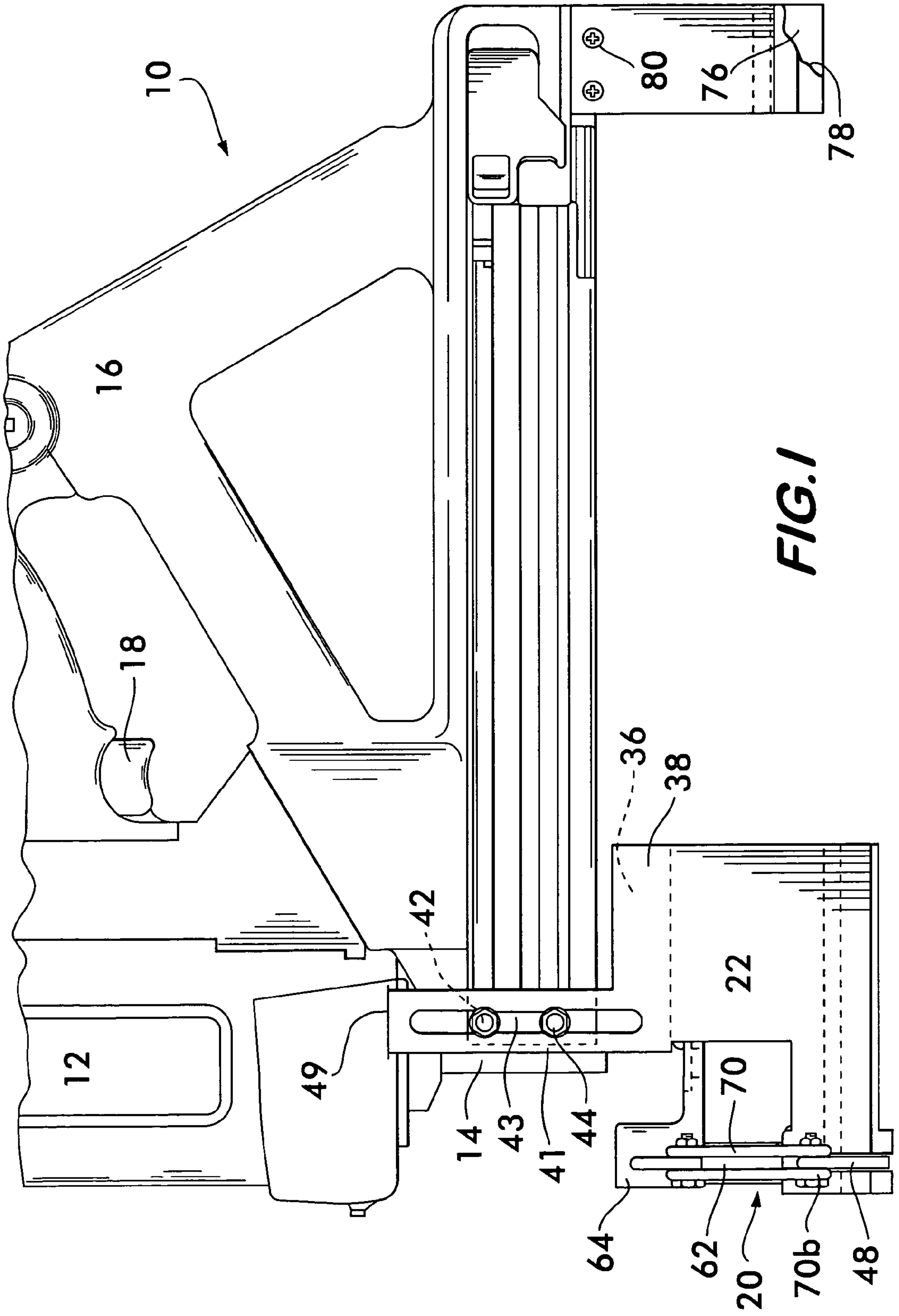
FIG. 1 is a partial side view of a power crimping tool according to the invention.

FIG. 1 shows a power crimping tool 10 according to the invention. Tool 10 comprises an actuator 12, which is preferably electrically powered but may also be powered by other practical means such as pneumatically. A ram 14 is attached to the actuator 12, the ram being movable in reciprocating motion by the actuator. A handle 16 is attached to the actuator 12 to allow the tool to be manually gripped. A trigger 18 is mounted on the handle 16. When the tool 10 is armed (described below) and the trigger is manually depressed, the actuator 12 is caused to drive the ram 14 in a single cycle of reciprocal motion, outwardly from and then back toward the actuator.

Figure 2:
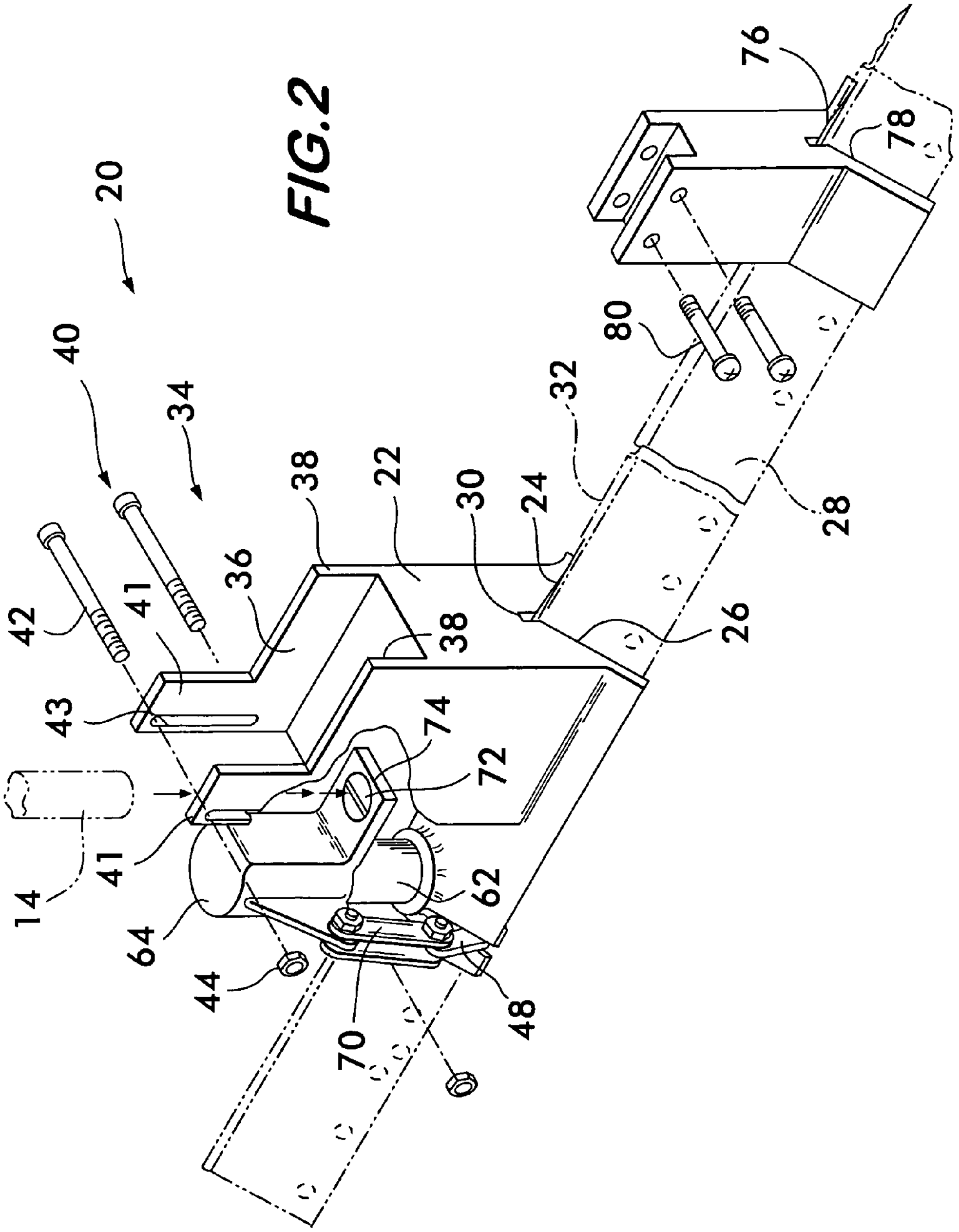
FIG. 2 is a perspective view of a portion of the crimping tool shown in FIG. 1 engaging a workpiece.
Figure 3:
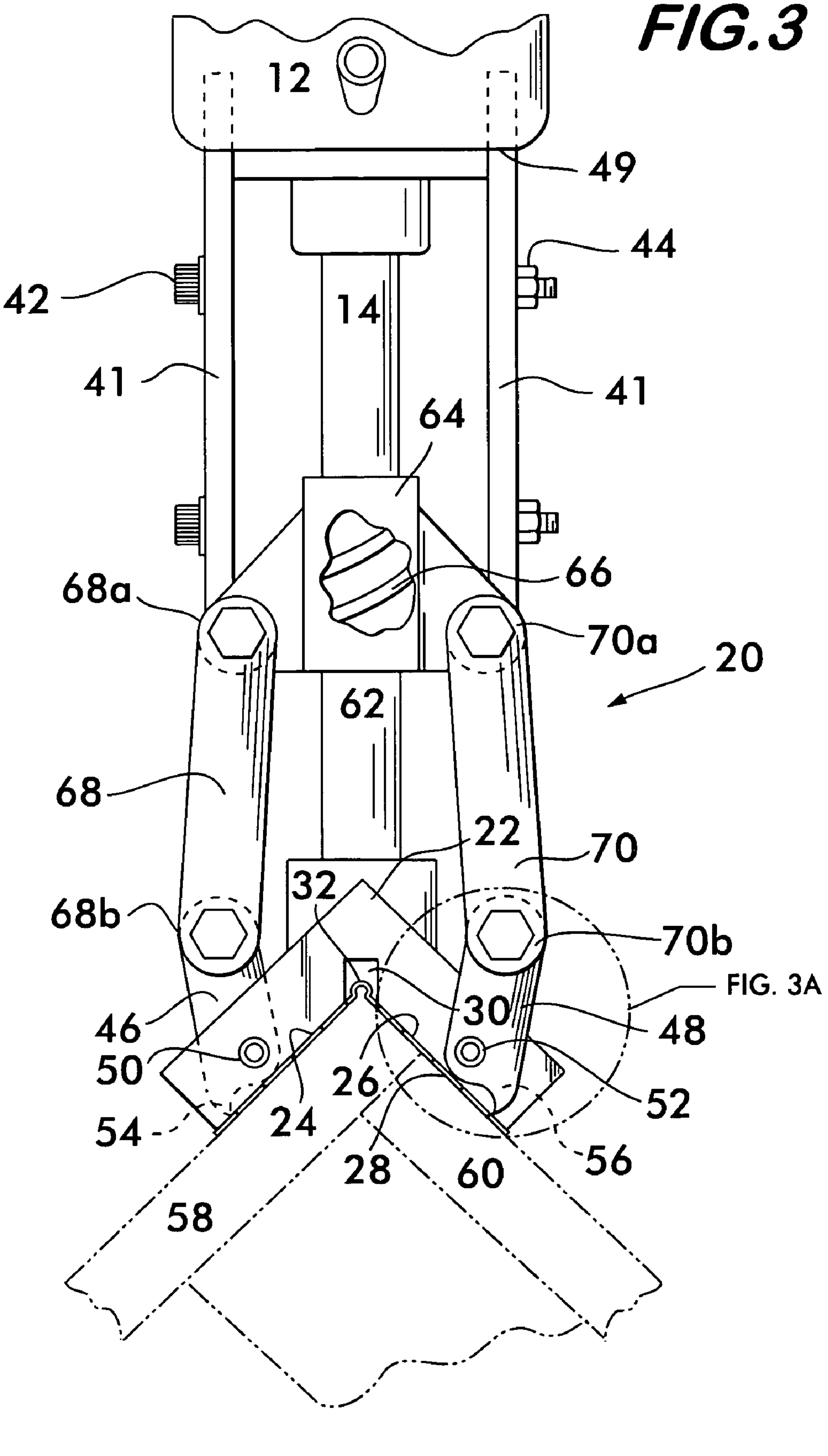
FIG. 3 is a front view of the power crimping tool engaging a workpiece.

A crimping mechanism 20 is attached to the handle 16 adjacent to actuator 12. Crimping mechanism 20 is preferably releasably attached to handle 16 as described in detail below, thereby allowing the actuator 12 to be used in conjunction with appropriate attachments for functions other than crimping, such as driving nails. As best shown in FIGS. 2 and 3, crimping mechanism 20 comprises a body 22 having contact surfaces 24 and 26. The contact surfaces are oriented at a right angle to one another so as to advantageously engage an angle piece 28 to be crimped. The contact surfaces 24 and 26 are separated by a groove 30 which runs lengthwise along the body to receive a bead 32 formed at the vertex of the angle piece 28.

Figure 1A:
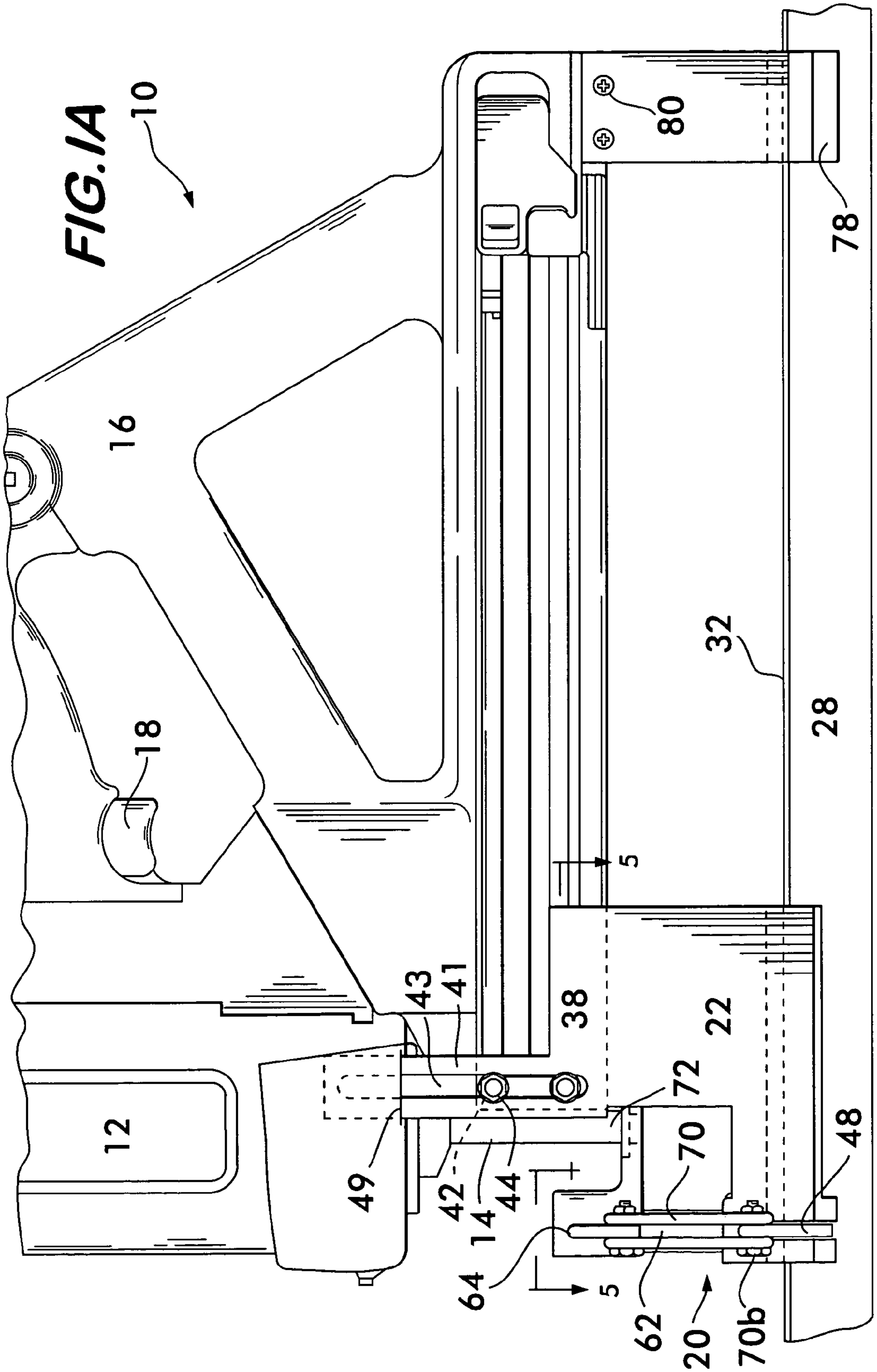
FIG. 1A is a partial side view of the power crimping tool shown in FIG. 1 engaging a workpiece.

As shown in FIG. 2, a receiver 34 is positioned on body 22 opposite contact surfaces 24 and 26. Receiver 34 is preferably a channel 36 defined by a pair of flanges 38 positioned in spaced relation so as to receive the handle 16 as shown in dotted line in FIG. 1A. With reference again to FIG. 2, an attachment device 40 extends from the receiver 34 to engage handle 16. Attachment device 40 preferably comprises a pair of mounting brackets 41 having slots 43 which receive bolts 42. Bolts 42 are retained within the slots by nuts 44. Bolts 42 engage holes through the handle 16 (not shown) and releasably attach the body 22 to the handle as illustrated in FIGS. 1 and 1A. The body 22 is easily removable from the handle 16 by removing the bolts 42. The body 22 is also slidable toward and away from the actuator 12, the slots 43 allowing relative motion between the body 22 and the handle 16 when the tool 10 engages a workpiece as shown by a comparison of FIGS. 1 and 1A.

As best shown in FIG. 3, jaws 46 and 48 are mounted on body 22, one jaw adjacent to each contact surface 24 and 26 respectively. Jaws 46 and 48 pivot about respective pivot axes 50 and 52. Jaw 46 has a tooth 54 mounted eccentric to the pivot axis 50, and jaw 48 has a tooth 56 mounted eccentric to the pivot axis 52. Eccentric positioning of the teeth 54 and 56 allow them to extend outwardly from the respective contact surfaces 24 and 26 to crimp the angle piece 28 to another workpiece, such as drywall panels 58 and 60, when the jaws 46 and 48 are pivoted about their respective pivot axes 50 and 52. This operation is described in more detail below.

As shown in FIGS. 2 and 3, a post 62 is mounted on body 22 between jaws 46 and 48. Post 62 extends in a direction away from the contact surfaces 24 and 26. A head 64 is slidably mounted on post 62, the head being guided by the post in reciprocal motion toward and away from the contact surfaces 24 and 26. Preferably, a biasing device in the form of a coil spring 66 is positioned between the head 64 and post 62 and biases the head away from the post. As shown in FIG. 3, a link 68 extends from head 64 to jaw 46. One end 68*a* of the link 68 is pivotally mounted to the head 64 and the opposite end 68*b* is pivotally mounted to the jaw 46 in spaced relation to the jaw's pivot axis 50. A similar link 70 extends between head 64 and jaw 48, the ends 70*a* and 70*b* of the link 70 being pivotally attached to the head 64 and the jaw 48 respectively.

Figure 3A:
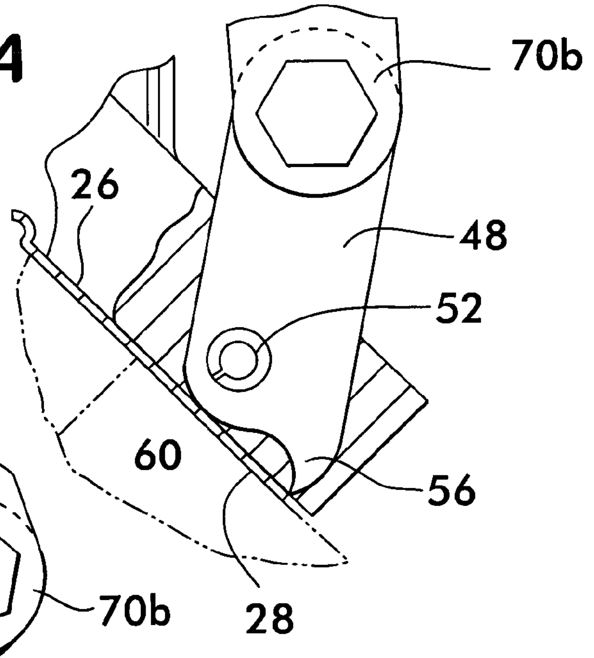
FIG. 3A is a partial view on an enlarged scale taken at circle 3A in FIG. 3.
Figure 4A:
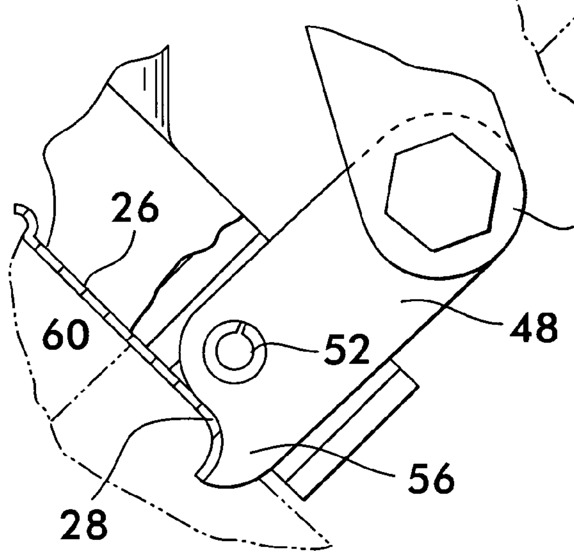
FIG. 4A is a partial view on an enlarged scale taken at circle 4A in FIG. 4.
Figure 5:
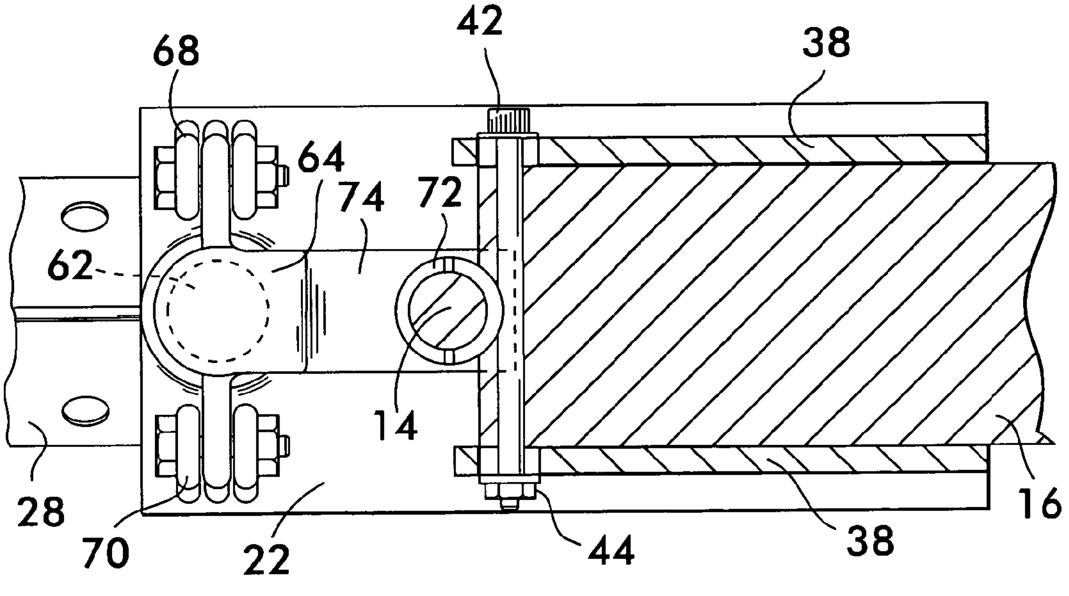
FIG. 5 is a sectional view taken at line 5—5 in FIG. 1A.

As shown in FIGS. 2 and 5, an impact surface 72 is positioned on a flange 74 extending outwardly from head 64. The impact surface 72 receives the force of the ram 14 and is preferably a sacrificial surface which is removable and replaceable as it wears out. During the course of its reciprocal motion, as depicted by a comparison of FIGS. 3 and 4, ram 14 engages impact surface 72 and forces head 64 to move against the biasing force of spring 66 toward the contact surfaces 24 and 26. Motion of the head 64 is transmitted by links 68 and 70 to jaws 46 and 48 respectively. The jaws are caused to pivot substantially simultaneously and the teeth 54 and 56 on each jaw extend outwardly from contact surfaces 24 and 26 and engage and crimp the angle piece 28 to the drywall panels 58 and 60. Motion of jaw 48 is shown in detail in FIGS. 3A and 4A, the motion of jaw 46 being substantially similar.

As shown in FIG. 1, supplemental contact surfaces 76 and 78 are mounted onto handle 16 in spaced relation to body 22. Supplemental contact surfaces are preferably releasably mounted to handle 16 using bolts 80. As shown in FIG. 2, the supplemental contact surfaces 76 and 78 align with the aforementioned contact surfaces 24 and 26 when tool 10 engages the angle piece 28, the supplemental contact surfaces 78 and 78 supporting and aligning the tool when in use.

As shown in FIG. 1, tool 10 is prepared for use by mounting the body 22 and the supplemental contact surfaces 76 and 78 onto the handle 16, the body being mounted by bolts 42 extending through handle 16 and engaging slots 43 in mounting brackets 41. The bolts are retained by nuts 44.

Operation of tool 10 is described below with reference to FIGS. 1, 1A, 3 and 4. With reference to FIG. 3, the angle piece 28, comprising a first workpiece, is positioned overlying an outside corner formed by drywall panels 58 and 60 which constitute a second workpiece. Contact surfaces 24 and 26 are placed in engagement with the angle piece 28, substantially aligning the tool 10 with the outside corner. Handle 16 is pushed toward the workpieces 28, 58 and 60 causing the handle 16 to slide relatively to the body 22 until the supplemental contact surfaces 76 and 78 engage the angle piece 28. As shown in FIGS. 1A and 3, mounting brackets 41 enter actuator 12 through access ports 49 and engage a switch (not shown) positioned within the actuator which arms the tool 10. When the tool is armed electrical power is made available to the actuator, the power being controlled by trigger 18. This is a safety feature which allows the tool to operate only when the body 22 is properly engaged with a workpiece, such as angle piece 28.

Figure 4:
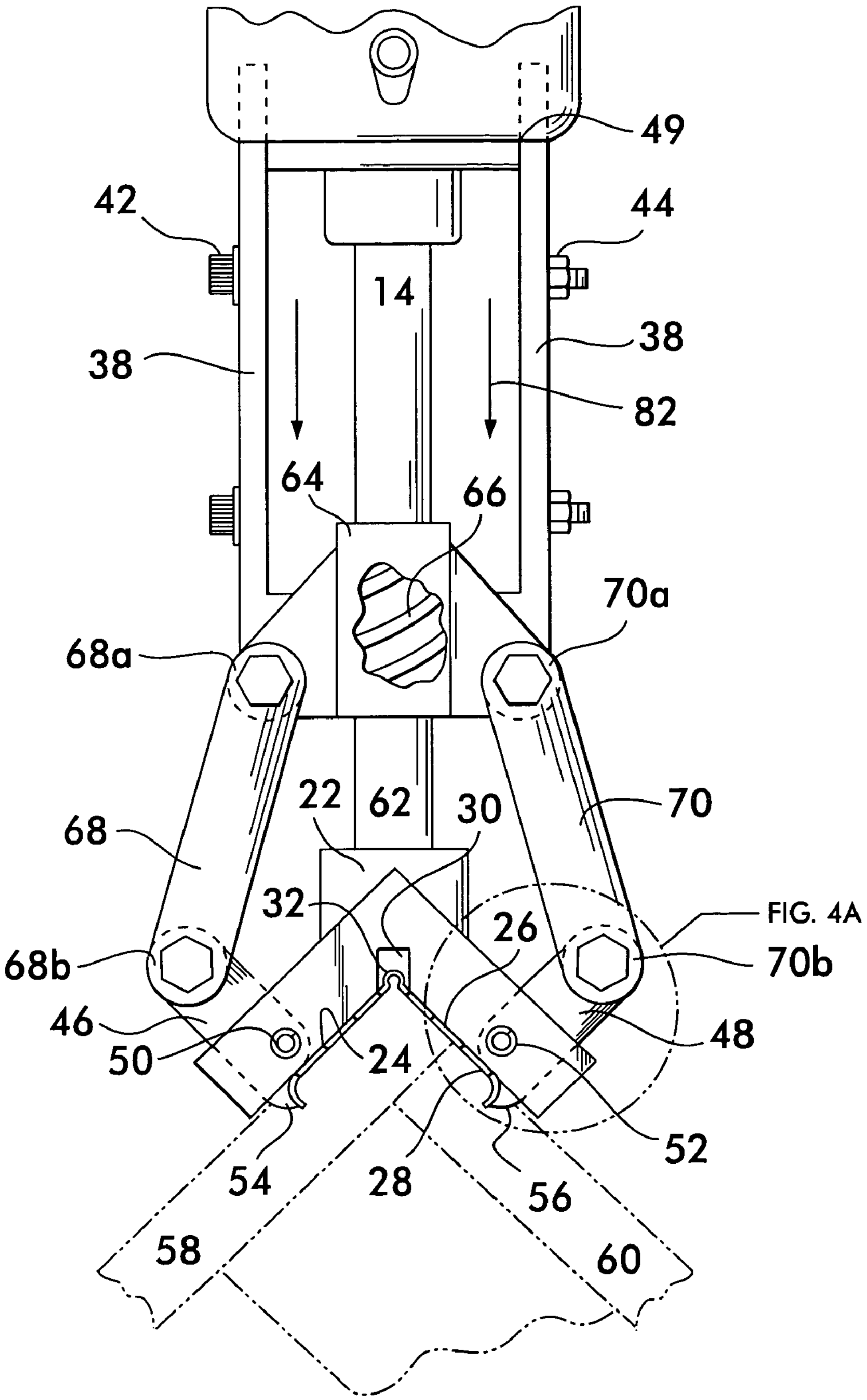
FIG. 4 is a front view of the power crimping tool engaging a workpiece.

When trigger 18 is pulled while the tool is armed it causes actuator 12 to cycle ram 14 through a single reciprocal stroke. As shown in FIG. 1A, the ram 14 engages the impact surface 72, forcing the head 64 toward the contact surfaces 24 and 26. Motion of ram 14 and head 64 is indicated in FIG. 4 by arrows 82. Links 68 and 70 transmit the motion of head 64 to the jaws 46 and 48, causing them to pivot about respective axes 50 and 52. Pivoting motion of the jaws causes the teeth 54 and 56 on each jaw to extend outwardly from contact surfaces 24 and 26 respectively and crimp the first workpiece (angle piece 28) to the second workpiece (drywall panels 58 and 60). Ram 14 retreats from engagement with impact surface 72 during the course of its motion and the head 64 is pushed back away from the contact surfaces 24 and 26 by the biasing spring 66. Again, links 68 and 70 transmit the motion of the head 64 to the jaws 46 and 48 which pivot in the opposite direction and draw teeth 54 and 56 back to a position recessed beneath the contact surfaces 24 and 26. The tool 10 is then repositioned along the angle piece 28, armed by moving the handle 16 relatively to body 22 so that mounting brackets 41 close the arming switch, and the trigger is pressed again to form another crimp. This procedure is repeated until the angle piece 28 is secured to drywall panels 58 and 60.

Figure 6:
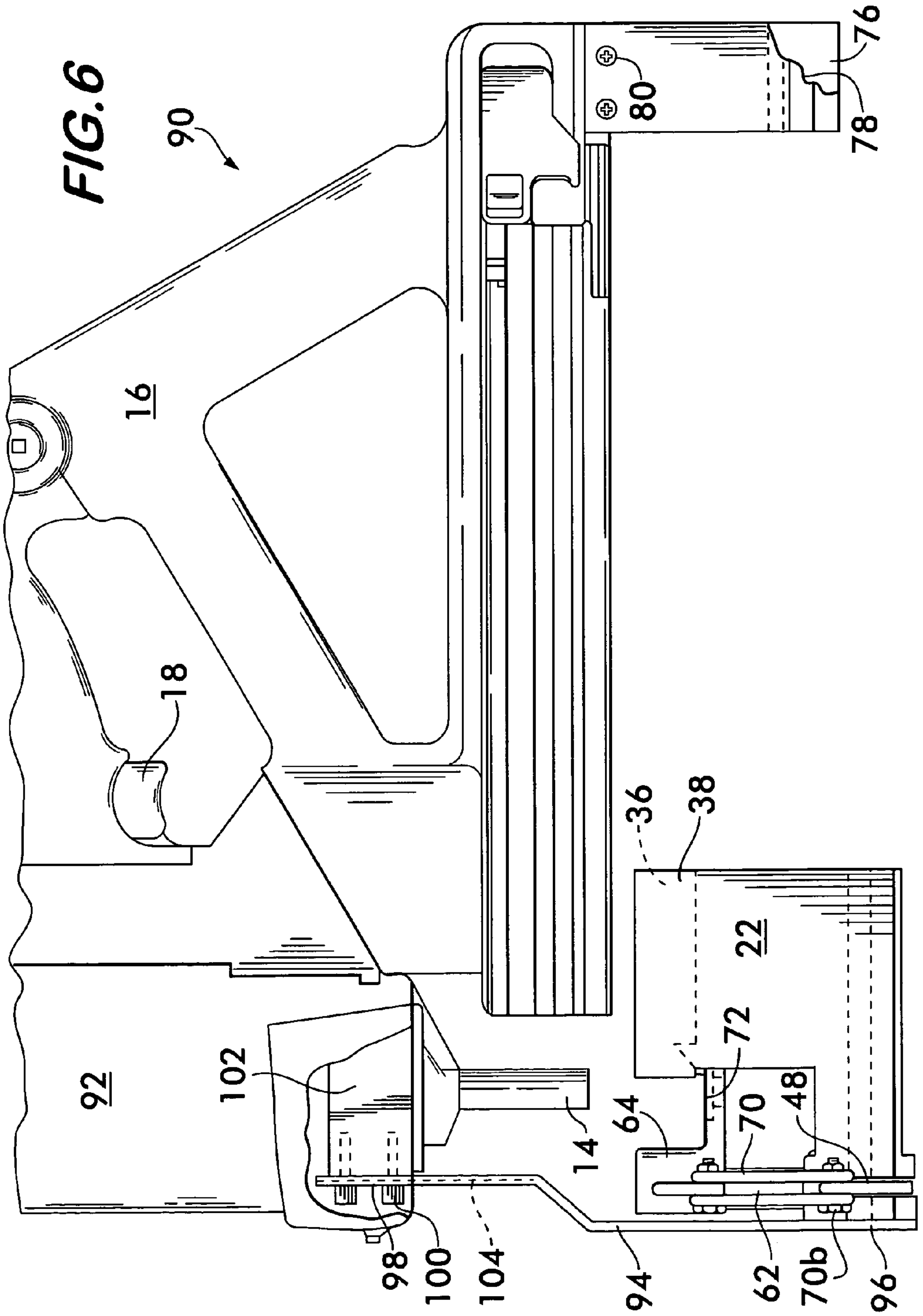
FIG. 6 is a partial side view of another embodiment of a power crimping tool according to the invention.
Figure 6A:
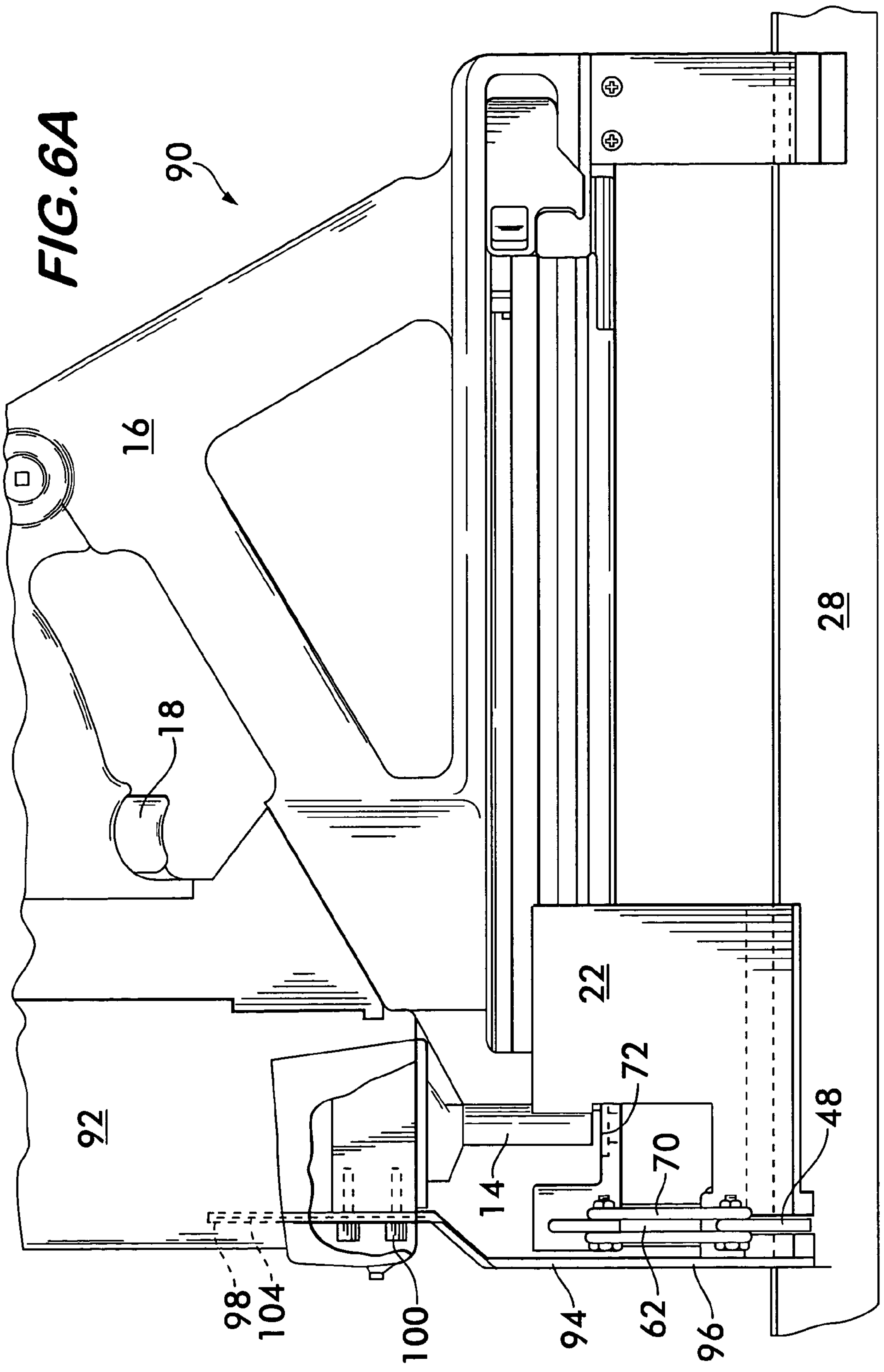
FIG. 6A is a partial side view of the power crimping tool shown in FIG. 6 engaging a workpiece.

The configuration of power crimping tool 10 shown in FIGS. 1 and 1A is provided by way of example only and may be modified to suit a particular actuator design 12 and still remain within the scope of the invention. Actuators from various manufacturers will differ in design details and the crimping mechanism 20 is readily adaptable to fit any design. By way of example, an alternate embodiment of the tool 90 from a different manufacturer than tool 10 and having a different design is illustrated in FIGS. 6 and 6A. Tool 90 has substantially the same components as tool 10 and operates substantially as described above but, being supplied by a different manufacturer, will have an actuator 92 that has a different internal layout. This may, for example, require that body 22 of crimping mechanism 20 be mounted onto the actuator 92 differently from the mounting used with actuator 12. To this end, as shown in FIG. 6, a mounting bracket 94 is used to slidably mount body 22 onto the actuator 92. Bracket 94 is designed to comply with the particular design and operation of actuator 92 and comprises a first end 96 attached to the front end of body 22 adjacent to jaws 46 (not shown) and 48. An opposite end 98 is attached to the actuator 92, for example, by screws 100 which are adapted to engage an existing nose piece assembly 102 that would otherwise be engaged by a lockout probe (not shown) used when the actuator performs a different function, such as for a nail driving gun. Screws 100 are received within an elongated slot 104 that extends lengthwise along bracket 94 thus allowing the bracket to slide relatively to actuator 92 and permit the body 22 to move toward and away from the actuator. Sliding motion of the body 22 is effected when it engages a workpiece 28 as shown by a comparison of FIGS. 6 and 6A. The motion of the bracket end 98 within the actuator 92 allows body 22 to move to a position as shown in FIG. 6A wherein ram 14 can engage impact surface 72 and effect the crimping function. Bracket end 98 is also used to trip a switch (not shown) within the actuator 92 that arms the tool 90 and allows trigger 18 to control the crimping operation as described previously.

Although tool 10 is described above as having modular components which are assembled onto an actuator/handle unit, it is also feasible that the tool be dedicated only to the crimping function, in which case the crimping mechanism 20 and the supplemental contact surfaces 76 and 78 would be permanently attached to handle 16. Furthermore, when the tool is a multi-purpose tool, there may be other safety features applicable to one function but not relevant to another function of the tool which must be overridden to arm the tool. For example, when the tool is used to drive nails, it usually will not function unless there are nails loaded in the tool. When such a tool is converted to a crimping function, although the nails are no longer relevant, the safety feature requiring nails to be loaded in the tool is still operative. This safety feature may be overridden by providing a mode switch on the handle which eliminates the need for nails to be loaded by closing the circuit which would otherwise be closed when nails are loaded in the tool. Alternatively, the components, such as the body 22 may also trigger an override switch when mounted on the handle 16 which eliminates the need for nails loaded in the tool when a crimping function is being performed.

Power crimping tools according to the invention will increase productivity, provide uniformity of crimping action and reduce the possibility of injury due to repetitive motion.

What is claimed is:

1. A tool for crimping a first workpiece to a second workpiece positioned beneath said first workpiece, said tool being mountable on an actuator having a reciprocable ram for effecting said crimping, said tool comprising:

- a body having a contact surface engageable with said first workpiece;
- a jaw pivotally mounted on said body adjacent to said contact surface;
- a tooth mounted on said jaw, said tooth being movable in a direction facing outwardly from said contact surface upon pivoting of said jaw for forcing said tooth into said first and second workpieces thereby crimping said first workpiece to said second workpiece;
- a head movably mounted on said body and having an impact surface engageable with said ram;
- a link having a first end pivotally attached to said head and a second end pivotally attached to said jaw, said link causing said jaw to pivot and move said tooth in said outwardly facing direction upon motion of said head;
- a biasing member positioned between said head and said body, said biasing member biasing said head away from said body, thereby drawing said tooth in a direction toward said contact surface;
- a receiver mounted on said body and adapted to engage said actuator;
- an attachment device adapted to attach said actuator to said receiver for mounting said tool to said actuator; and
- said crimping being effected by said ram moving said head, said links causing pivoting of said jaws, said teeth being thereby forced into said first and second workpieces to crimp said workpieces together.

2. A tool according to claim 1, further comprising:

- a second contact surface mounted on said body and engageable with said first workpiece, said second contact surface being oriented at an angle to said first named contact surface;
- a second jaw pivotally mounted on said body adjacent to said second contact surface;
- a second tooth mounted on said second jaw, said second tooth being movable in a direction facing outwardly from said second contact surface upon pivoting of said second jaw for forcing said second tooth into said first and second workpieces; and
- a second link having a first end pivotally attached to said head and a second end pivotally attached to said second jaw, said second link causing said second jaw to pivot and move said second tooth in said outwardly facing direction upon motion of said head.

3. A tool according to claim 2, wherein said jaws pivot substantially simultaneously thereby moving said teeth in said outwardly facing directions substantially simultaneously and into said first and second workpieces.

4. A tool according to claim 2, wherein said contact surfaces are oriented at right angles relative to one another.

5. A tool according to claim 1, wherein said biasing member comprises a spring.

6. A tool according to claim 1, wherein said receiver comprises a channel positioned within said body opposite to said contact surface and said attachment device comprises a bolt extending transversely through said channel and engaging said actuator for attaching said actuator to said body.

7. A tool for crimping a first workpiece to a second workpiece positioned beneath said first workpiece, said tool comprising:

- a body having first and second contact surfaces engageable with said first workpiece, said contact surfaces being oriented at a right angle to one another;
- a first jaw pivotally mounted on said body adjacent to said first contact surface;
- a first tooth mounted on said first jaw, said first tooth being movable in a direction facing outwardly from said first contact surface upon pivoting of said first jaw;
- a second jaw pivotally mounted on said body adjacent to said second contact surface;
- a second tooth mounted on said second jaw, said second tooth being movable in a direction facing outwardly from said second contact surface upon pivoting of said second jaw;
- an actuator having a movable rain positioned proximate to said body;
- a head movably mounted on said body, said head being engaged with said ram, said ram effecting motion of said head;
- a biasing member positioned between said head and said body and biasing said head away from said body;
- a first link having a first end pivotally attached to said head and a second end pivotally attached to said first jaw;
- a second link having a first end pivotally attached to said head and a second end pivotally attached to said second jaw; and said crimping being effected by said ram moving said head, said links causing pivoting of said jaws, said teeth being thereby forced into said first and second workpieces to crimp said workpieces together.

8. A tool according to claim 7, wherein said first and second jaws pivot substantially simultaneously thereby forcing said first and second teeth into said first and second workpieces substantially simultaneously.

9. A tool according to claim 7, wherein said actuator is electrically powered.

10. A tool according to claim 7, wherein said actuator is pneumatically powered.

11. A tool according to claim 7, further comprising third and fourth contact surfaces oriented at a right angle relatively to one another, said third and fourth contact surfaces being positioned in spaced relation to said first and second contact surfaces and engageable with said first workpiece simultaneously with said first and second contact surfaces.

12. A tool for crimping a first workpiece to a second workpiece positioned beneath said first workpiece, said tool being mountable on an actuator having a reciprocable ram for effecting said crimping, said tool comprising:

a body having a contact surface engageable with said first workpiece;

a jaw pivotally mounted on said body adjacent to said contact surface;

a tooth mounted on said jaw, said tooth being movable in a direction facing outwardly from said contact surface upon pivoting of said jaw for forcing said tooth into said first and second workpieces thereby crimping said first workpiece to said second workpiece;

a head movably mounted on said body and having an impact surface engageable with said ram;

a link having a first end pivotally attached to said head and a second end pivotally attached to said jaw, said link causing said jaw to pivot and move said tooth in said outwardly facing direction upon motion of said head;

a receiver mounted on said body and adapted to engage said actuator, said receiver comprising a channel positioned within said body opposite to said contact surface;

an attachment device adapted to attach said actuator to said receiver for mounting said tool to said actuator, said attachment device comprising a bolt extending through said channel and engaging said actuator for attaching said actuator to said body; and said crimping being effected by said ram moving said head, said links causing pivoting of said jaws, said teeth being thereby forced into said first and second workpieces to crimp said workpieces together.

* * * * *